United States Patent [19]

Geppelt et al.

[11] Patent Number: 4,995,450

[45] Date of Patent: Feb. 26, 1991

[54] HEAT PIPE

[75] Inventors: Elmo W. Geppelt; William H. Poore, both of Tulsa, Okla.

[73] Assignee: G.P. Industries, Inc.

[21] Appl. No.: 395,581

[22] Filed: Aug. 18, 1989

[51] Int. Cl.$^5$ ............................................. F28D 15/02
[52] U.S. Cl. .................. 165/104.21; 165/45; 165/179; 165/184; 119/73; 29/890.032
[58] Field of Search ................... 165/104.21, 184, 179, 165/177, 45; 119/73; 29/890.032

[56] References Cited

U.S. PATENT DOCUMENTS 2,118,060  5/1938  Stone et al. ................. 165/184

FOREIGN PATENT DOCUMENTS 2330497  1/1975  Fed. Rep. of Germany ...... 165/184
2025603  1/1980  United Kingdom ........... 165/104.21

Primary Examiner—Albert W. Davis, Jr.
Attorney, Agent, or Firm—Head & Johnson

[57] ABSTRACT

A heat pipe for providing enhanced thermal conductivity for transfering heat from a heat sink, such as the earth, to a separate medium, including an elongated, generally vertical, tube closed at each end and having a heat absorption portion adjacent the lower end and a heat dissipation portion adjacent the upper end, the wall of the tube having an integral spiraled groove therein forming internal spiraled valleys and ridges, a refrigerant within the tube having a liquid and a vapor phase wherein the refrigerant is converted to vapor in the heat absorption portion and the vapor is converted to liquid in the heat dissipation portion, the vapor being free to rise within the interior of the tube, the condensed liquid refrigerant flowing downwardly in the tube interior spiraled valleys.

2 Claims, 3 Drawing Sheets

HEAT PIPE

SUMMARY OF THE INVENTION

Heat pipes are devices which provide improved thermal conductivity. Heat pipes are used for transferring heat from one area or medium to another area or medium. Heat pipe functions in the same way as a solid object, connecting one medium to another wherein there is a temperature differential. The function of a heat pipe is to substantially increase the rate of heat transfer compared to that of a solid object. For instance, a copper rod is an effective heat transfer device, however, a heat pipe of the same external configuration can be employed to transfer heat at a rate many items greater than that of a solid copper rod.

The known types of heat pipes include an elongated tubular element, closed at each end. The tubular element contains a refrigerant which is capable of vaporization upon the absorption of heat and liquefaction upon cooling. Means are typically provided within the heat pipe providing an avenue for separating the path of liquid flow from the path of vapor flow. However, in the simplest heat pipe having a smooth internal cylindrical surface and operated in a vertical manner, the fluid flow path is the wall of the heat pipe, the fluid being retained to the wall by surface tension. In other types of heat pipes, separate flow paths are provided, such as, by the use of cylindrical internal wicks, tubular internal dividing walls, and so forth.

The present invention is directed towards an improved type of heat pipe in which the same tubular member which provides the vapor flow passageway simultaneously provides, without the use of any secondary element a liquid return path.

The heat pipe of this disclosure is in the form of an elongated tube having a first lower end and a second upper end, the ends being closed. A heat absorption portion is formed adjacent the first end and a heat dissipation portion is formed adjacent the second end. The tube has an internal surface and an external surface and the wall of the tube has formed therein an internal spiraled groove forming spaced, spiraled valleys and ridges.

The tube is positioned wherein the heat dissipation portion adjacent the second end is elevated above the heat absorption portion adjacent the first end.

A refrigerant is placed within the tube, the refrigerant having a liquid and a vapor phase, and wherein at least a portion of the refrigerant liquid phase is converted to vapor in the heat absorption portion, and wherein at least a portion of the vapor phase is converted to liquid in the heat dissipation portion as the heat pipe is in use. When the vapor is condensed to liquid in the heat dissipation portion, the liquid refrigerant flows downwardly to the heat absorption portion in the spiraled valleys formed in the tube wall.

The improved heat pipe of this disclosure is preferably formed of a conductive metal, such as copper or aluminum, or alloys thereof. The tube is twisted in a manner to provide spiral grooves extending substantially the full length thereof. The integral spiral is formed in the tube by twisting the tube in a controlled manner so that one or more spiral convolutes are formed, and the spiral convolutes provide internal downwardly inclined spiral flow channels in the internal tube wall.

A better understanding of the invention will be had by reference to the following description and claims, taken in conjunction with the attached drawings.

DESCRIPTION OF THE DRAWINGS

FIG. 5 shows the configuration of the heat pipe as in FIG. 2, but showing the use of U-shaped fins on the exterior of the tube to improve the heat transfer characteristics.

DESCRIPTIONS OF THE PREFERRED EMBODIMENT

The use of heat pipes is known. For reference to detail information concerning heat pipes, their use and construction, reference may be had to *Heat Pipes*, P. Dunn and D. A. Reay, Pergamon Press, Oxford, 3rd Edition 1982 which is incorporated herein by reference.

Figure 1:
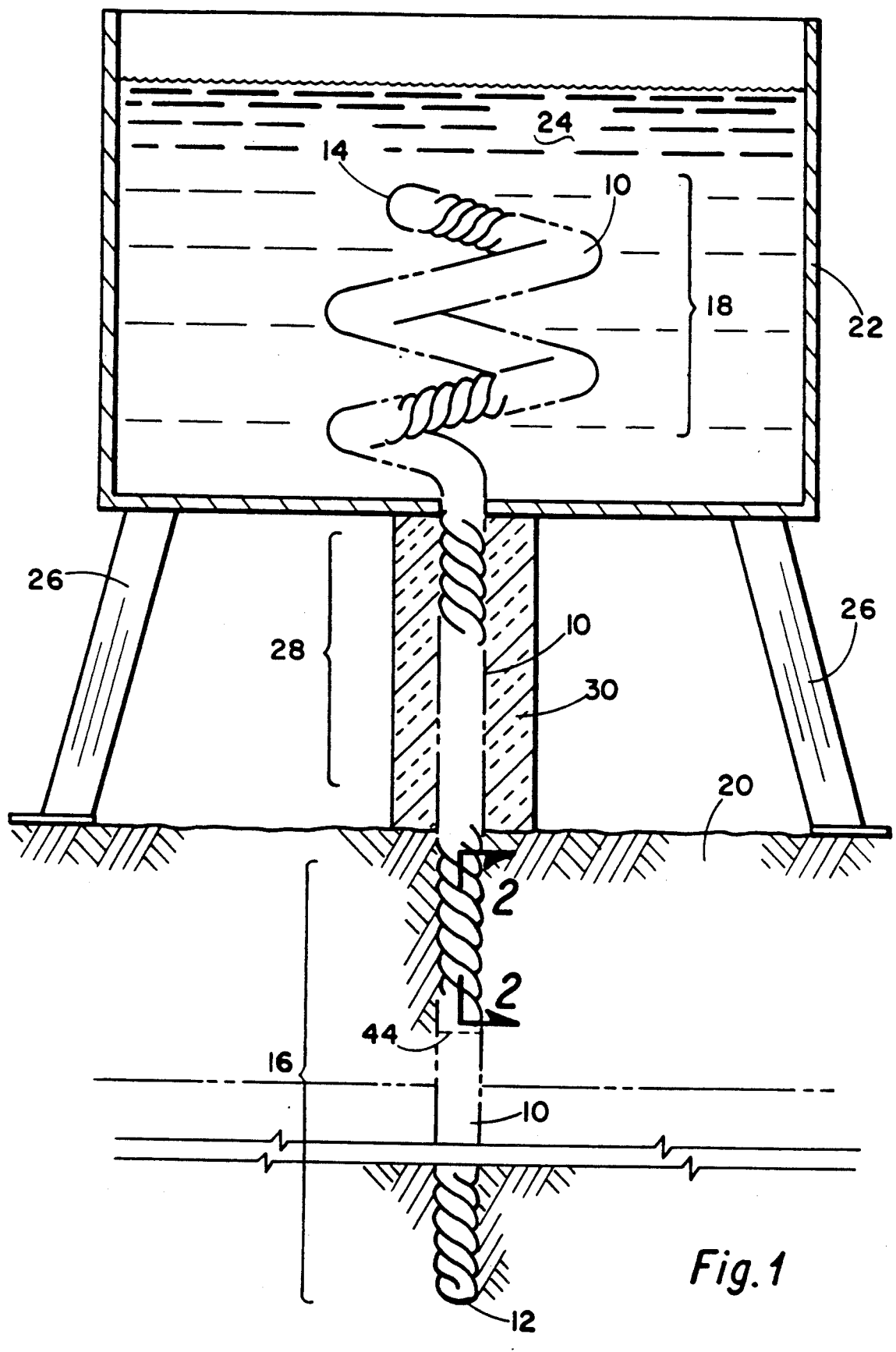
FIG. 1 is an elevational view, shown partially in cross-section, of an improved heat pipe. The heat pipe is illustrated as used for conducting heat from the earth to a tank of water supported above and adjacent the earth's surface.

Referring to FIG. 1, the improved heat pipe of this invention is shown in conjunction with a rudimentary example of the application of the heat pipe. The heat pipe is indicated by the numeral 10. The heat pipe 10 is an elongated tube having a first end 12 and a second end 14, that is, the tube 10 is closed at each end and has, in the preferred embodiment, no openings therein. The second end 10 is elevationally higher than the first end 12, however, this does not require that the tube 10 be precisely vertical.

Adjacent the first end 12, and indicated by brackets 16, is a heat absorption portion. Adjacent the second end 14, and indicated by bracket 18, is a heat dissipation portion. In the illustrated application of a practical employment of the improved heat pipe 10 in FIG. 1, the heat absorption portion 16 is in intimate contact with the earth 20. Supported above the earth is a tank 22 having water 24 therein, such as used in watering livestock or the like. The tank 22 is supported above the earth by means of legs 26. The intermediate portion of the heat pipe, that is, the portion between heat absorption portion 16 and heat dissipation portion 18, is indicated by bracket 28. Insulation 30 surrounding the intermediate proton of the heat pipe 28.

The heat pipe and the method of use described up to this point is a known teaching. The unique feature of the present disclosure is in the configuration of heat pipe 10, which is best illustrated in the fragmentary cross-sectional view of FIG. 2.

Figure 2:
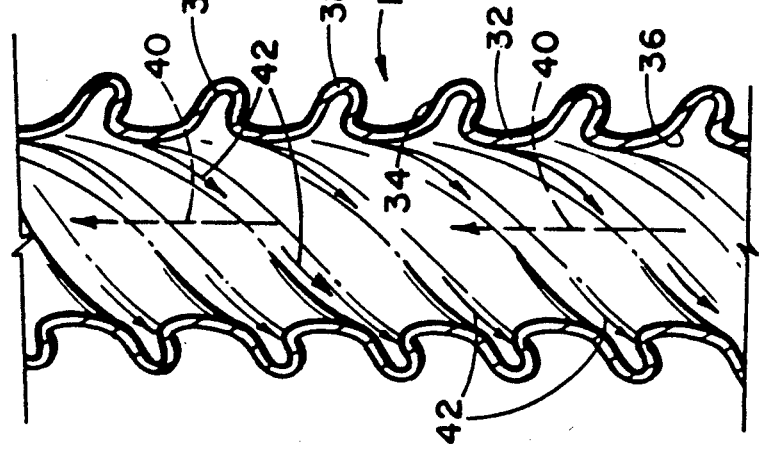
FIG. 2 is an enlarged cross-sectional view taken along the line 2—2 of FIG. 1 and showing the details of the wall of the tube having integral spirals formed therein.

The heat pipe 10, as shown in FIG. 2, has a wall 32 having an exterior surface 354 and an interior surface 36. Formed in wall 32 are integral spiraled convolutes 38. These spiraled convolutes 38 are formed in the tube wall 32 by twisting the tube or by special forming. Tube 10 is preferably formed of a heat conducted metal, such as aluminum, copper or the like, or alloys thereof. A spiraled tube having a cross-sectional arrangement of that of FIG. 2 is commercially available from Delta T Limited, 1507 East 7th, Tulsa, Okla.

The heat tube 10 has a refrigerant therein which is, within the rage of the temperatures for which the tube is designed, converted from a liquid to a vapor by the absorption of heat in the heat absorption portion 16, and from vapor to liquid in the heat dissipation portion 18. As the liquid refrigerant is converted into vapor in the at absorption portion 16, the vapor is free to rise unobstructedly within the tube as shown in FIG. 2, the rising refrigerant vapor being indicated by the dotted arrows 40. In the heat dissipation portion 18 of the tube, adjacent the second end 14, at least a part of the rising refrigerant vapors 40 are converted into liquid. At least a substantial portion of the liquid adheres to the interior wall 36 of the tube and as it accumulates, flows downwardly within the interior of convolutes 38, the downwardly flowing liquid being indicated by solid arrows 42. The liquid flows downwardly through the intermediate portion 28 of the tube and into the heat absorption portion 16 where a liquid level, such as at 44 in FIG. 1, is established.

Thus, the unique configuration of the tube of FIG. 2 provides internal spiraled troughs in the tube wall 32 which afford, in the same structure and without the use of any secondary element, unobstructed flow paths for the returning liquid refrigerant. These defined flow paths for returning liquid refrigerant help isolate the returning liquid flow from the upward vapor flow to reduce heat transfer between the liquid and the vapor, and thereby permit a greater percentage of the heat of vaporization to be carried from the heat absorption portion 16 to the heat dissipation portion 18.

Figure 3:
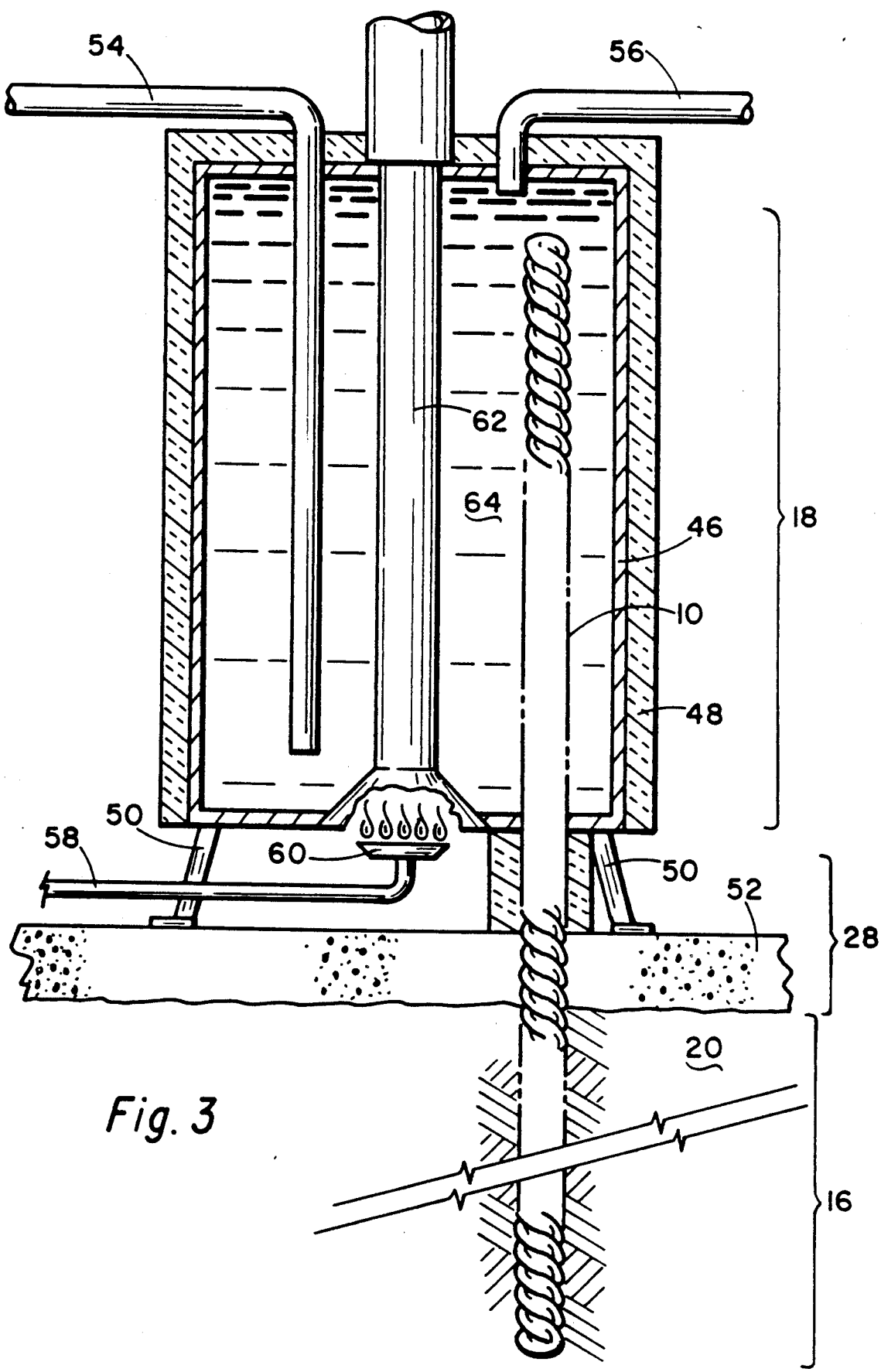
FIG. 3 is an elevational cross-sectional view such as in FIG. 1, but showing another application of the improved heat pipe of this invention, for transferring heat from the earth to the interior of a hot water heater to thereby prevent the hot water heater from freezing during cold weather if the normal heat source to the hot water heat is inadvertently lost.

FIG. 3 shows another example of the employment of the improved heat pipe of this invention. In this Figure a hot water heat 46 is surrounded by insulation 48 and is supported on legs 50 above a building floor 52 and is used to supply hot water. An inlet pipe 54 conducts cold water into the hot water heater, and an outlet pipe 56 carries hot water away from it. A gas pipe 58 conveys a combustible gas to a burner 60. Products of combustion are conveyed through the interior of the hot water heater by flue 62 to heat water 64 within the hot water heater. Typically, the gas flowing through pipe 58 to burner 60 is controlled by means of a thermostat (not shown)l. If the hot water 46 is left unattended in a cold, winter environment, such as in a cabin or in a room wherein the occupants are away from an extended time, the water 64 will remain warm and will not be subject to freezing. However, if the flame is extinguished from burner 60 then the water 64 may be subject to freezing, thereby damaging the heat water heater. The heat pipe 10 maintains water 64 above freezing temperature in the event of loss of gas pressure.

Heat pipe 10 of FIG. 3 functions as previously described with reference to FIG. 1, that is, heat is transferred form the earth 10 through the heat absorption portion indicated by brackets 16, through the intermediate portion indicated by bracket 28, to the heat dissipation portion indicated by bracket 18. Thus, heat is transferred from the earth to the water 64 within the hot water heater 46 and by proper engineering, sufficient heat can be supplied to maintain the temperature of water 64 above freezing. The heat pipe 10 of FIG. 3 functions in the exact way as described with reference to FIGS. 1 and 2 with the refrigerant vapors rising within the interior of the heat pipe and the downwardly returning liquid refrigerant flowing in the internal spiral channels formed in the wall of the heat pipe.

Figure 5:
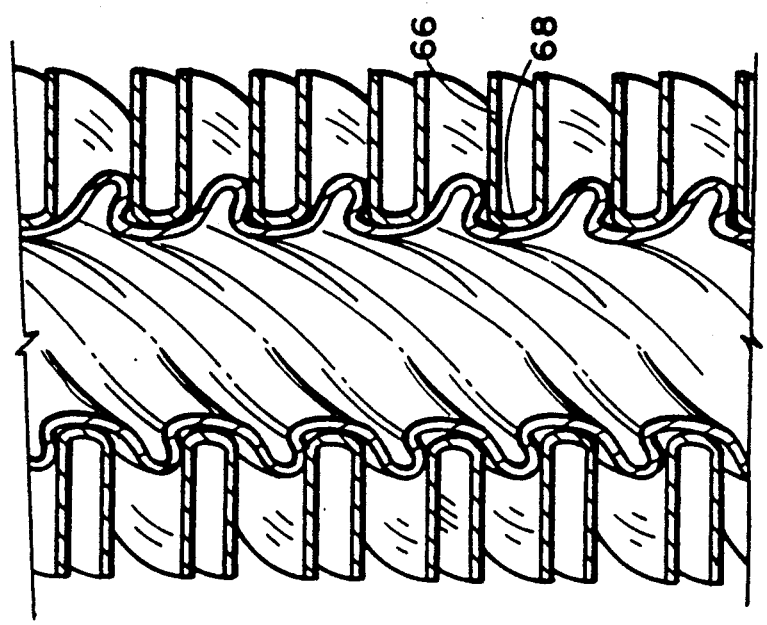
FIG. 5 is a cross-sectional view of an additional alternate embodiment.
Figure 4:
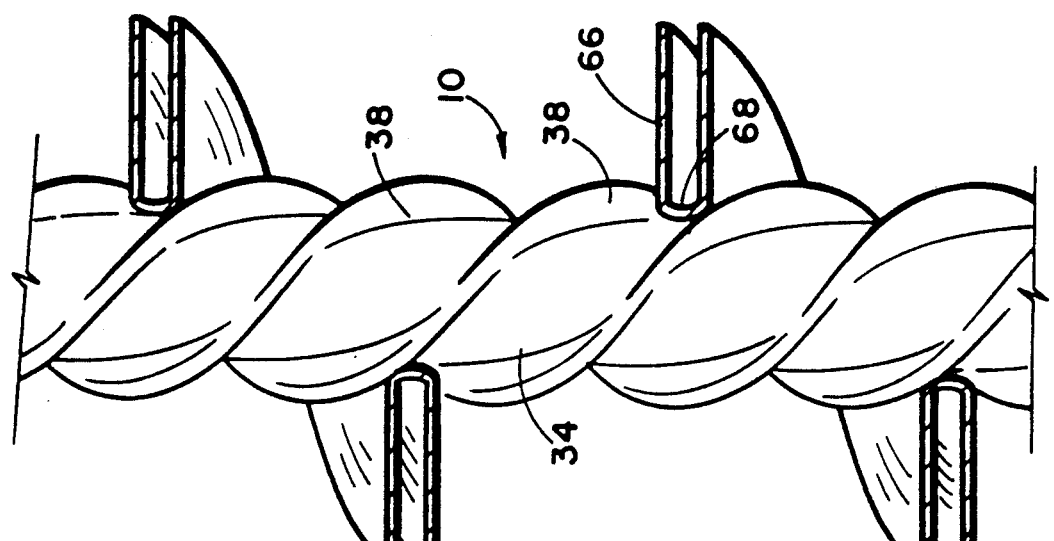
FIG. 4 is an external view of an alternate embodiment of the heat pipe showing the use of an external fin for improving the heat transfer characteristics.

FIGS. 4 and 5 show an alternate embodiment of the heat pipe. FIG. 4 shows heat pipe 10 having the internal spirals 38 as previously described, but showing, secured to the exterior wall 34, a spiraled U-shaped fin 66. Fin 66 has a base 68 which is attached to or is in intimate contact with the tube wall exterior surface 34 so that heat is transferred through the fin 66 to wall 38 of the tube. Fin 66 increases the rate of heat transfer from the tube to the media in which the tube is positioned, including the media surrounding the heat absorption portion 16 and the heat dissipation portion 18. In FIG. 4 the spiral fin 66 is shown on a tube 10 which as three paralleled integral spiraled convolutes 38 with the fin 66 being only in one of the three paralleled spiraled convolutes. Obviously, the fin can be in all of the spiraled convolutes.

FIG. 5 shows a cross-sectional view as in FIG. 2, showing the U-shaped fin 66 in each of the spiraled convolutes. FIGS. 4 and 5 illustrate that means to enhance the transfer of heat to and from the improved heat tube may be employed in keeping with the basic concept of the heat tube, that is, the provision of integral internal spiraled liquid flow channels.

The claims and the specification describe the invention presented and the terms that are employed in the claims draw their meaning from the use of such terms in the specification. The same terms employed in the prior art may be broader in meaning than specifically employed therein. Whenever there is a question between the broader definition of such terms used in the prior art and the more specific use of the terms herein, the more specific meanings is meant.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A heat pipe for transferring heat from a heat sink, such as the earth, to a separate medium comprising:

an elongated tube having a first and a second end, and being closed at each end and having a heat absorption portion adjacent the first end and a heat dissipation portion adjacent the second end, the tube having a wall with an internal surface and an external surface and the wall of the tube having an internal spiraled groove therein providing a spiraled valley and a spiraled ridge in both the interior and exterior surfaces, the heat dissipation portion of the tube being elevationally above the heat absorption portion, the spiraled valley and ridge defining a trough having opposed wall portions that, in a plane of the tube longitudinal axis, are of height greater than the portion between the wall portions providing a spiraled fluid carrying trough on the wall internal surface extending from said heat absorption portion to said heat dissipation portion; and a refrigerant within said tube having a liquid and a vapor phase and wherein at least a portion of the refrigerant liquid is convertible to vapor in the heat absorption portion and wherein at least a portion of the vapor is convertible to liquid in the heat dissipation portion and wherein at least part of the liquid refrigerant is conducted from said heat dissipation portion to said heat absorption portion in said tube wall spiraled fluid carrying trough.

2. A heat pipe according to claim 1 wherein said spiraled tube has on the exterior surface a spiraled fin having a base edge, the fin base edge being affixed to said tube external surface within said spiral groove, the fin being spiraled upon said tube at the same pitch as said tube integral spiral, the fin extending generally radially thereof in a cross-section taken perpendicular the tube length.

* * * * *